United States Patent [19] [11] Patent Number: 4,681,632
Bes et al. [45] Date of Patent: Jul. 21, 1987

[54] SOLID PARTICULATE COLORING COMPOSITION

[75] Inventors: Richard F. T. Bes; Jan D. Knol, both of Apeldoorn, Netherlands

[73] Assignee: Holland Colours Apeldoorn B.V., Netherlands

[21] Appl. No.: 825,193

[22] Filed: Feb. 3, 1986

[51] Int. Cl.$^4$ .............................................. C09D 11/00
[52] U.S. Cl. ........................................ 106/19; 106/23; 106/288 R
[58] Field of Search ........... 106/23, 31, 288 R, 308 F, 106/19

[56] References Cited

U.S. PATENT DOCUMENTS

| | | | |
|---|---|---|---|
| 2,338,176 | 1/1944 | Goepfert | 106/19 |
| 3,011,899 | 12/1961 | Bergman | 106/19 |
| 3,732,115 | 5/1973 | Lankard et al. | 106/19 |
| 3,873,687 | 3/1975 | Deinko | 106/19 |
| 3,953,218 | 4/1976 | Pollard | 106/19 |
| 4,233,328 | 11/1980 | Dawson et al. | 424/78 |
| 4,250,327 | 2/1981 | Dawson et al. | 560/193 |
| 4,599,112 | 7/1986 | Yokoyama et al. | 106/22 |

Primary Examiner—Paul Lieberman
Assistant Examiner—Willie J. Thompson
Attorney, Agent, or Firm—Ostrolenk, Faber, Gerb & Soffen

[57] ABSTRACT

Solid particulate coloring composition comprising a number of components including at least one component being liquid at ambient temperature obtained by mixing a molten carrier material which is solid at ambient temperature; one or more of said components which are liquid at ambient temperature, a pigment of dyestuff, and a particulate material having a large specific surface, preferably a synthetic silica material and dividing said mixture into particles being solid under ambient conditions.

4 Claims, No Drawings

SOLID PARTICULATE COLORING COMPOSITION

BACKGROUND TO THE INVENTION

1. Field of the invention

The present invention relates to a solid particulate colouring composition obtained by mixing a molten carrier, at least one pigment or dye and at least one other compound being liquid at ambient temperature and dividing said mixture in particles being solid under ambient conditions.

2. Description of the Prior Art

Solid composition of this type in which the carrier is a compound presenting a melting point from 30° C. to 250° C. such as glycerolmonostearate, esters of phtalic acid, waxes etc., are widely used throughout the industry for a variety of purposes varying from colouring compositions for polymeric products to special purpose coloured additive compositions for cosmetic creams etc.

Said known solid compositions generally have the drawback that they may show stickyness at ambient temperature in those cases where one or more of the components are in liquid form at ambient temperature. When this is the case, the material will, if in particulate form, present massive agglomeration leading to material losses because of material sticking to the walls of containers or packages, possibility of inhomogenous mixing, pollution of mixing and metering equipment and lacking free flowing properties so that it is difficult to add such particulate material to e.g. plastics in a very even manner.

SUMMARY OF THE INVENTION

In view of the foregoing factors it is a primary object of the present invention to provide solid compositions which include components being liquid at ambient temperature and yet are free from tackyness at temperatures ranging from, say, 15°-35° C., in order to provide a product which allows easy handling, transport, mixing and metering without any of the beforementioned drawbacks.

Said object is attained according the present invention in that the solid particulate colouring composition is obtained by mixing;

a molten carrier material being solid at ambient temperature having a melting point below 250° C.
at least one component being liquid at ambient temperature
a pigment or dyestuff and
a particulate material having a large specific surface and dividing the obtained mixture into particles.

Preferable the solid particulate colouring composition according the invention is obtained by mixing the mentioned components in the following sequence:

molten carrier material
pigment or dyestuff
at least one component being liquid at ambient temperature
particulate material having a large specific surface.

Suitable metable carriers are wax and wax like materials including hydrogenated castor oil (mp 94° C.); esters of pentaerythritol and fatty acids having 12-18 carbon atoms, such as the mono or tetra ester of pentaerythritol and stearic acid (mp 50°-53° C. and 64° C. respectively).

Components which are liquid at ambient temperature may comprise esters of dicarboxylic acids, preferably aromatic dicarboxylic acids. A component falling in that range is dioctyl phtalate, a well known plasticizing agent.

Other components which are liquid at ambient temperature are liquid stabilizing agents for polymeric materials.

Such components may generally be described as organometal compounds.

Compounds falling within this description are organolead, organoantimoon and organotin compounds. Of those organotin compounds are specially preferred by virtue of their less toxic character. A very great number of suitable organotin compounds is known; of the specially preferred type the liquid organotinsulfide compounds for stabilizing vinyl-resins may be mentioned; those organotinsulfide compounds generally having from 10-42% by weight of tin and 8-42% by weight of sulfur.

Examples of such compounds are:
dimethyltin bis (isooctyl thioglycolate)
dimethyltin bis (isooctyl 2-thiopropionate)
dibutyltin bis (isooctyl 2-thiopropionate).

Tackyness as a result of the presence of one or more of the aforementioned liquid components may, according the invention, be overcome by addition of a particulate material having a large specific surface.

All kinds of suitable particulate materials having large specific areas are known in the art, such as alumina, silica, zeolyte material, clays etc; all are usable in the composition according the invention, either as such or in mixtures.

Of those materials synthetic silica having a specific surface of between 200 and 700 $m^2/g$ is specially preferred.

The pigments or dyestuffs which are usable in the present colouring composition include the known wide variety of organic and inorganic pigments which are generally insoluble in the vehicle used and dyes which are considered soluble.

The invention particularly concerns a colouring composition comprising from 40-70% by weight of a pigment or dyestuff, from 10-40% by weight of hydrogenated castor oil, from 2-20% by weight of an organotin stabilizing agent and 1-15% by weight of synthetic silica having a specific surface in the order of 400 $m^2/g$, the total of weight percentages adding up to 100.

Such colouring composition may be used for colouring articles of polymeric material such as polyvinyl chloride articles. The composition according the invention is very easy to handle, free flowing and divides homogeneously both in abovementioned polyvinyl chloride but also in other polymers during for instance extrusion moulding processes.

The composition may also contain metal soaps such as calcium, zinc, cadmium or lead stearate in amounts of 0 to 5 weight %.

Also surface active substances may be present in the solid composition according the invention, chosen from nonionic and anionic surface active substances.

By addition of surface active substances the pigmentation-ratio, which is the weight of pigment per unit weight of total composition, may be increased to values of 95% without negatively effecting the flowing characteristics of the molten carrier resin in the mixing procedure.

The solid composition is preferably brought into particulate form either by the process which is known in the art as prilling or by pressing a soldified molding against a rotating cylindrical grate whereupon grated shavings of the solid composition are obtained.

The invention will now be illustrated by way of the following detailed examples.

EXAMPLE I 3.4 kg of molten hydrogenated castor oil (mp 94° C.) is mixed with 4.9 kg of titaniumdioxide pigment. After thorough mixing during 60 minutes a liquid organotin stabilizer in the form of 1.5 kg dimethyltin bis (isooctyl 2-thiopropionate) is added during mixing and subsequently 3.0 kg of synthetic silicate (Aerosil 380 ®Degussa 380 m$^2$/g) are added.

The mixing is continued until a complete homogeneous paste is obtained which is free from agglomerates. After the mixing procedure the mixture is solidified in molds to moldings of 200×50×20 mm.

The moldings are brought into contact with a rotating grate, leading to the separation of shavings having a size from 0.5 to 3.0 mm.

The obtained shavings are absolutely tack-free and may be used for colouring plastic material.

EXAMPLE II 100 kg of the molten composition obtained in example I containing all ingredients is sprayed in air in a cylindrical vessel having e.g a diameter of 6 m, a height of 1.20 m and a conical bottom with a top angle of approximately 60°. A horizontally rotating heatable disk is disposed on top of the axis of the cylindrical vessel, the melt being fed to this disk. The centrifugal force will force the liquid toward the edge of the disk, said liquid then passing the disk and leaving the same as a filament or as a film, dependent upon the flowing properties.

The filaments or film respectively, will form droplets, starting in a horizontal plane, and gradually foming an ever-inclining spray screen, dependent upon the distance toward the wall of the vessel, which will get gradually smaller.

Provided the contours of the spheres will not get too large, the cooling time for a complete solidification appears to be sufficient.

The lower side of the spray screen is forced inwardly by means of a tangential air-inlet.

The product obtained according to the aforedescribed spray-solidification or prill-process has a particle size of 0.2 to 2 mm and is excellently free-flowing and absolutely dustfree. It lends itself particularly for a volumetric dispension and is very suitable for colouring powdered products and similar masses.

By adding phtalic acid esters, waxes and metal soaps, the flow behavior of the carrier may be adjusted in such a way that lower working temperatures are possible for forming the liquid mixtures in comparison with mixtures not containing the phtalic acid esters, waxes and metal soaps.

What is claimed is:

1. Solid particulate coloring composition in the form of a mixture comprising:
   a molten carrier material which is solid at ambient temperature and having a melting point below 250° C.;
   at least one compound which is liquid at ambient temperatures and which comprises a liquid stabilizing agent for polymeric materials in the form of an organometal compound;
   a pigment or dyestuff; and
   a particulate material having a large specific surface, said mixture being divided into particles which are solid under ambient conditions.

2. The composition of claim 1, in which the organometal compound is an organotin compound.

3. Solid particulate coloring composition according to claim 1 in which the organotin compound is a liquid organotinsulfide having from 10–42% by weight of tin and from 8–42% by weight of sulfur.

4. Solid particulate coloring composition according to claim 1 wherein the composition comprises from 40–70% by weight of the pigment or dyestuff, from 10–40% by weight of hydrogenated castor oil, from 2–20% by weight of the organotin stabilizing agent and 1–15% by weight of synthetic silica having a specific surface in the order of 400 m$^2$/g, the total weight percentages adding up to 100.

* * * * *